(12) United States Patent
Ohgushi et al.

(10) Patent No.: US 8,467,764 B2
(45) Date of Patent: Jun. 18, 2013

(54) EMERGENCY INFORMATION DELIVERING METHOD, RADIO CONTROL APPARATUS RADIO BASE STATION AND MOBILE TERMINAL

(75) Inventors: Ryohei Ohgushi, Yokosuka (JP); Eisuke Endoh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 195 days.

(21) Appl. No.: 12/740,539

(22) PCT Filed: Oct. 28, 2008

(86) PCT No.: PCT/JP2008/069541
§ 371 (c)(1),
(2), (4) Date: Jun. 29, 2010

(87) PCT Pub. No.: WO2009/057588
PCT Pub. Date: May 7, 2009

(65) Prior Publication Data
US 2010/0267356 A1 Oct. 21, 2010

(30) Foreign Application Priority Data
Oct. 29, 2007 (JP) ................................ 2007-280557

(51) Int. Cl.
*H04M 11/04* (2006.01)

(52) U.S. Cl.
USPC ..................................... 455/404.1; 455/404.2

(58) Field of Classification Search
USPC ........................................... 455/404.1, 404.2
See application file for complete search history.

(56) References Cited

U.S. PATENT DOCUMENTS

| 2007/0021099 A1* | 1/2007 | Sato .......................... 455/404.1 |
| 2009/0042546 A1* | 2/2009 | McClendon ............... 455/414.1 |
| 2009/0130972 A1* | 5/2009 | Andersen et al. ........... 455/3.01 |

FOREIGN PATENT DOCUMENTS

| CN | 1138807 A | 12/1996 |
| CN | 1909696 A | 2/2007 |
| JP | 10-304421 | 11/1988 |
| JP | 2000-244976 | 9/2000 |
| JP | 2002-176673 | 6/2002 |
| JP | 2005-309993 | 11/2005 |
| JP | 2006 349358 | 12/2006 |
| JP | 2007 156766 | 6/2007 |

OTHER PUBLICATIONS

Office Action issued Apr. 6, 2011, in Indonesian Patent Application No. W-00 2010 01732 (with English-language translation).
Japanese Office Action issued Apr. 24, 2012, in Japan Patent Application No. 2007-280557 (with English translation).
Office Action issued Sep. 5, 2012 in Chinese Patent Application No. 200880113846.9 (with English Translation).
Japanese Office Action issued Oct. 2, 2012, in the counterpart Japanese patent application with English translation.

* cited by examiner

*Primary Examiner* — Chuong A Ngo
(74) *Attorney, Agent, or Firm* — Oblon, Spivak, McClelland, Maier & Neustadt, L.L.P.

(57) ABSTRACT

An emergency information delivering method according to the present invention includes the steps of: notifying, to a mobile terminal, generation of emergency information to be received, by use of a paging signal used to activate a broadcast communication function of the mobile terminal; notifying, from the mobile terminal to a user, the generation of the emergency information in response to the notification by the paging signal; transmitting, to the mobile terminal, detailed information of the emergency information as a broadcast communication message; and displaying, at the mobile terminal, the detailed information, after the broadcast communication function is activated by the paging signal, the detailed information being received as the broadcast communication message.

11 Claims, 4 Drawing Sheets

EMERGENCY INFORMATION DELIVERING METHOD, RADIO CONTROL APPARATUS RADIO BASE STATION AND MOBILE TERMINAL

TECHNICAL FIELD

The present invention relates to an emergency information delivering method for delivering emergency information to a mobile terminal with use of broadcast communication, and also relates to a radio control apparatus, a radio base station, and a mobile terminal.

BACKGROUND ART

The Japan Meteorological Agency is planning to start delivering the Earthquake Early Warning (emergency information) to the public (television, radio, administrative radio communication for disaster prevention, announcement in an amusement facility, and the like) on Oct. 1, 2007. The Earthquake Early Warning (emergency information) is also expected to be delivered to mobile terminals.

In addition, there is a request from local governments to deliver emergency information to a majority of users in the event of emergency such as a disaster. Accordingly, there is a need to instantly deliver emergency information of a terror, a warning, a large-scale accident, or the like to a majority of users.

However, a current mobile communication system (a mail delivery system and the like) is not capable of instantly delivering emergency information to a majority of mobile terminals in view of radio communication resources. Accordingly, a broadcasting system is needed to meet the requirements for such instant, large-scale delivery.

The CBS (Cell Broadcast Service) and the MBMS (Multimedia Broadcast Multicast Service) are known as schemes standardized in the 3GPP to build the broadcast system.

However, it takes approximately 10 seconds for such an existing broadcast system to deliver emergency information to a majority of mobile terminals.

This is because a network has to activate a broadcast communication function (for example, a CBS receiving function) of each mobile terminal, before delivering emergency information as a broadcast communication message. Keeping the broadcast communication function of the mobile terminal active all the time significantly influences the running time of the battery.

It is strongly demanded socially to shorten as much as possible the time needed to deliver emergency information, such as Earthquake Early Warning, that may affect human lives, because the shortening of the time may lead to saving the human lives. The time needed to deliver emergency information should be reduced to several seconds There is also a demand for emergency information to be delivered to a user roaming in a country other than the user's own country.

Each mobile terminal is configured to receive only the broadcast communication message having a message identifier included in a "reception ID list (a list of message identifiers each identifying a broadcast communication message to be received)" that the mobile terminal itself holds. For this reason, in order for the mobile terminal to receive a broadcast communication message notifying of emergency information in a country other than the user s own country, there is a need to define an internationally-common message identifier (emergency information message identifier) identifying a broadcast communication message notifying of emergency information.

However, in Japan and other countries, each telecommunication carrier has already defined its own emergency information message identifier, and a mobile terminal in a memory of which an emergency information message identifier defined by its own telecommunication carrier is written is already in widespread use. This results in the coexistence of a mobile terminal having a "reception ID list" in which an emergency communication message identifier common across the world is set and a mobile terminal having a "reception ID list" in which an emergency information message identifier unique to its own telecommunication carrier is set.

In such a circumstance, the network for delivering emergency information as a broadcast communication message needs to transmit both of a broadcast communication message including an emergency information message identifier that is common across the world and a broadcast communication message including an emergency information message identifier uniquely given by a telecommunication carrier. This causes the problem that reception delay occurs among the mobile terminals that receive the broadcast communication messages respectively including different emergency information message identifiers.

To solve this problem, there should be a migration method taking account of a circumstance where there coexist a mobile terminal using an emergency information message identifier unique to its own carrier and a mobile terminal using an emergency information message identifier common across the world, the emergency information message identifiers being used to determine whether or not to receive an emergency information message. Specifically, the migration method is to conduct gradual unification to an emergency information message identifier common across the world, while delivering, as a broadcast communication message, emergency information also to a mobile terminal having an emergency information message identifier unique to its own telecommunication carrier, without reception delay among mobile terminals respectively using different emergency information message identifiers.

DISCLOSURE OF THE INVENTION

The present invention has been made in view of the aforementioned problem and aims to provide an emergency information delivering method, a radio control apparatus, a radio base station, and a mobile terminal which can notify, to each user, the presence of emergency information earlier than in the case where existing broadcasting systems notify the user of the presence of emergency information.

In addition, the present invention aims to provide an emergency information delivering method, a radio control apparatus, a radio base station, and a mobile terminal can deliver emergency information efficiently without reception delay between coexisting mobile terminals, one having an emergency information message identifier unique to a telecommunication carrier and the other having an emergency communication message identifier common across the world.

A first aspect of the present invention is summarized as an emergency information delivering method for delivering emergency information to a mobile terminal using broadcast communication, including the steps of: notifying, to the mobile terminal, generation of emergency information to be received, by use of a paging signal used to activate a broadcast communication function of the mobile terminal; notifying, from the mobile terminal to a user, the generation of the emergency information in response to the notification by the paging signal; transmitting, to the mobile terminal, detailed information of the emergency information as a broadcast communication message; and displaying, at the mobile terminal, the detailed information, after the broadcast communication function is activated by the paging signal, the detailed information being received as the broadcast communication message.

In the first aspect, the paging signal can include a type of the emergency information; and the mobile terminal can perform the notification to the user, by performing a display corresponding to the type of the emergency information included in the received paging signal.

In the first aspect, the paging signal can include an overview of the emergency information; and the mobile terminal can perform the notification to the user, by displaying the overview of the emergency information included in the received paging signal.

In the first aspect, the paging signal can include a terminal operation identifier specifying an operation of the mobile terminal; and the mobile terminal can perform the notification to the user, by performing an operation specified by the terminal operation identifier included in the received paging signal.

In the first aspect, the mobile terminal can manage a broadcast communication message to be received; and the mobile terminal can receive the broadcast communication message, even when the broadcast communication message is not managed as the broadcast communication message to be received, and if the broadcast communication message includes an emergency information identifier identifying the detailed information of the emergency information.

A second aspect of the present invention is summarized as a radio control apparatus configured to transmit emergency information to a mobile terminal with use of broadcast communication, wherein the radio control apparatus is configured to notify, to the mobile terminal, generation of emergency information to be received, by use of a paging signal used to activate a broadcast communication function of the mobile terminal; and the radio control apparatus is configured to transmit, to the mobile terminal, detailed information of the emergency information as a broadcast communication message, after transmitting the paging signal to the mobile terminal.

A third aspect of the present invention is summarized as a radio base station configured to transmit emergency information to a mobile terminal with use of broadcast communication, wherein the radio base station is configured to notify, to the mobile terminal, of generation of emergency information to be received, by use of a paging signal used to activate a broadcast communication function of the mobile terminal; and the radio base station is configured to transmit, to the mobile terminal, detailed information of the emergency information as a broadcast communication message, after transmitting the paging signal to the mobile terminal.

A fourth aspect of the present invention is summarized as a mobile terminal configured to receive emergency information with use of broadcast communication, wherein the mobile terminal being configured to notify, to a user, generation of emergency information to be received, when the generation of the emergency information to be received is notified by a paging signal used to activate a broadcast communication function of the mobile terminal; and the mobile terminal being configured to display detailed information of the emergency information received as a broadcast communication message, after the broadcast communication function is activated by the paging signal.

In the fourth aspect, the mobile terminal can be configured to perform the notification to the user, by performing a display corresponding to a type of the emergency information included in the received paging signal.

In the fourth aspect, the mobile terminal can be configured to perform the notification to the user, by displaying an overview of the emergency information included in the received paging signal.

In the fourth aspect, the paging signal can include a terminal operation identifier for specifying an operation of the mobile terminal, the mobile terminal can be configured to perform the notification to the user, by performing an operation specified by the terminal operation identifier included in the received paging signal.

In the fourth aspect, the mobile terminal can be configured to manage a broadcast communication message to be received; and the mobile terminal can be configured to receive the broadcast communication message, even when the broadcast communication message is not managed as the broadcast communication message to be received, and if the broadcast communication message includes an emergency information identifier identifying the detailed information of the emergency information.

BEST MODE FOR CARRYING OUT THE INVENTION (Configuration of Emergency Information Delivering System according to First Embodiment of Present Invention)

A configuration of an emergency information delivering system according to a first embodiment of the present invention will be described with reference to FIG. 1 and FIG. 2.

First, with reference to FIG. 1, description will be given of differences between a conventional emergency information delivery scheme and an emergency information delivery scheme using the emergency information delivering system according to this embodiment.

Figure 1:
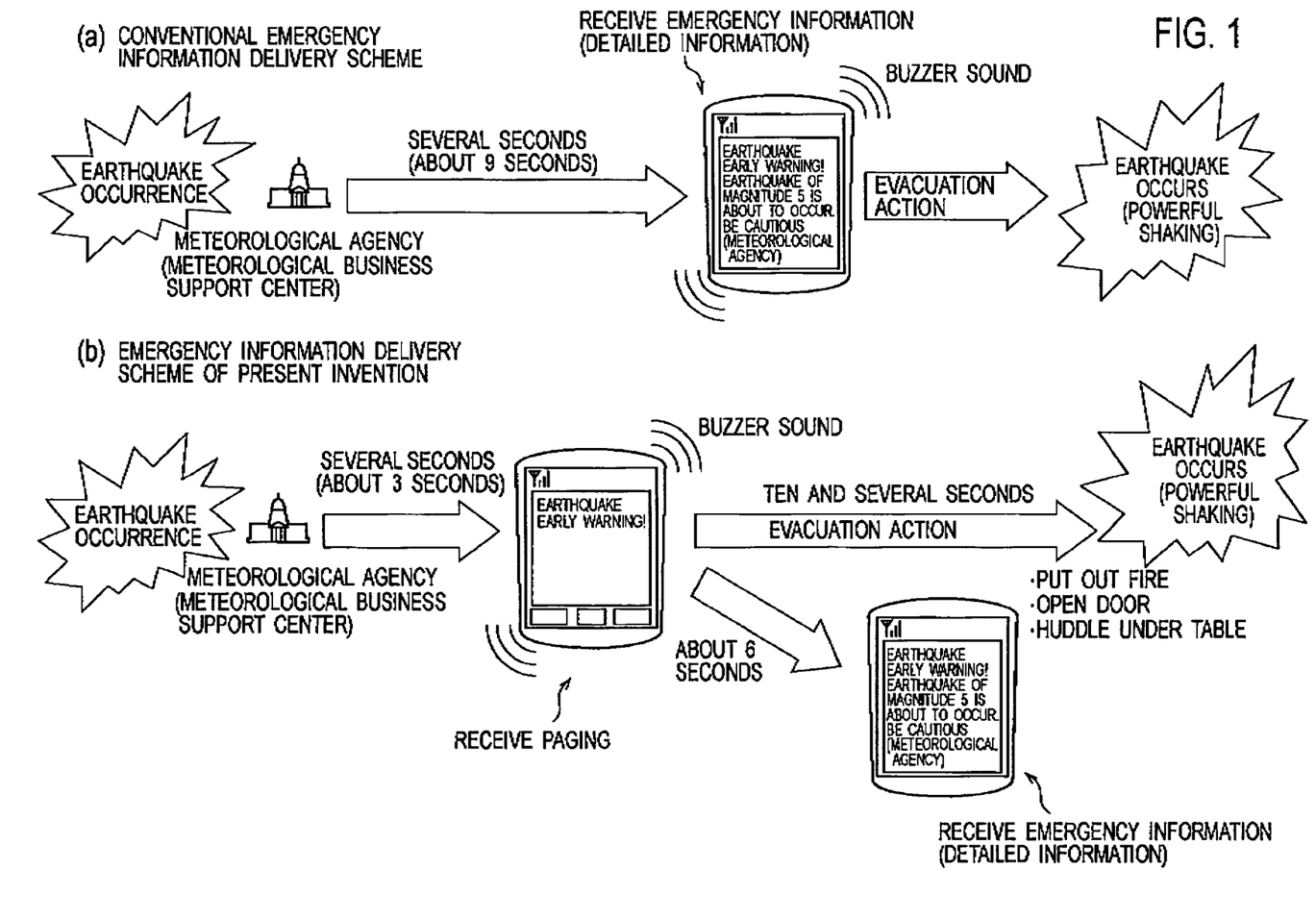
FIG. 1 is a diagram for explaining differences between an emergency information delivery scheme according to a first embodiment of the present invention and a conventional emergency information delivery scheme.

As shown in FIG. 1(*a*), in the conventional emergency information delivery scheme, a mobile terminal cannot notify, to a user, an occurrence of an emergency situation, before receiving emergency information (detailed information) transmitted as a broadcast communication message.

In contrast, as shown in FIG. 1(*b*), in the emergency information delivery scheme according to this embodiment, when receiving a paging signal including a "type of emergency information" and an "overview of emergency information", a mobile terminal can first notify, to a user, an occurrence of an emergency situation, the type of the emergency situation, and the overview of the emergency situation. Thereafter, the mobile terminal can notify, to the user, the details of the emergency situation, when receiving the detailed information of the emergency information.

Figure 2:
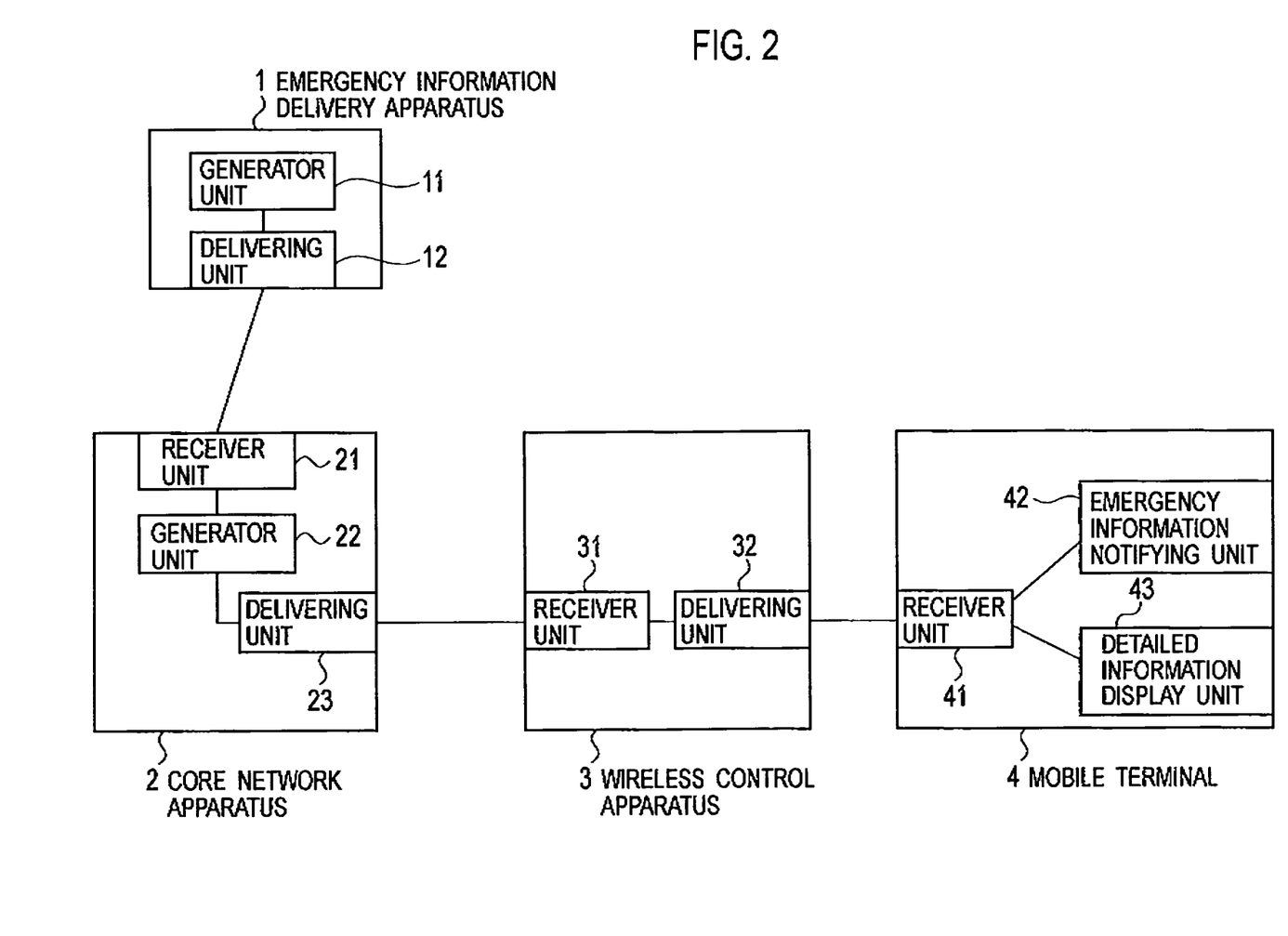
FIG. 2 is a functional block diagram of an emergency information delivering system according to the first embodiment of the present invention.

As shown in FIG. 2, the emergency information delivering system according to this embodiment includes an emergency information delivery apparatus 1, a core network apparatus 2, a radio control apparatus (or a radio base station) 3, and a mobile terminal 4.

The emergency information delivery apparatus 1 includes a generator unit 11 and a delivering unit 12.

The generator unit 11 is configured to generate emergency information when an emergency situation occurs. The delivering unit 12 is configured to deliver the emergency information generated by the generator unit 11, to the core network apparatus 2.

The core network apparatus 2 includes a receiver unit 21, a generator unit 22, and a delivering unit 23.

The receiver unit 21 is configured to receive the emergency information transmitted from the emergency information delivery apparatus 1.

The generator unit 22 is configured to generate a "type of emergency information", an "overview of emergency information", "detailed information of emergency information", and a "terminal operation identifier" that specifies the operation of the mobile terminal 4, on the basis of the emergency information received by the receiver unit 21.

The delivering unit 23 is configured to deliver the "type of emergency information", the "overview of emergency information", the "detailed information of emergency information", and the "terminal operation identifier" generated by the generator unit 22, to the radio control apparatus (or the radio base station) 3.

In addition, the delivering unit 23 may be configured to specify a delivery area of the emergency information (hereinafter, referred to as an emergency-information delivery area) to the radio control apparatus (or the radio base station) 3.

The radio control apparatus (or the radio base station) 3 includes a receiver unit 31 and a delivering unit 32.

The receiver unit 31 is configured to receive the "type of emergency information", the "overview of emergency information", the "detailed information of emergency information", and the "terminal operation identifier" transmitted from the core network apparatus 2.

The delivering unit 32 is configured to notify, to the mobile terminal 4, the generation of emergency information to be received (that is, the occurrence of the emergency situation), by using a paging signal to activate a broadcast communication system of the mobile terminal 4.

Specifically, the delivering unit 32 is configured to transmit the paging signal including the "type of emergency information", the "overview of emergency information", the "terminal operation identifier", and the like described above, to the mobile station 4 that belongs to the aforementioned "emergency-information delivery area".

In addition, the delivering unit 32 is configured to incorporate an "emergency information identifier" that identifies the detailed information of the emergency information in the aforementioned paging signal.

Moreover, the delivering unit 32 is configured to transmit the "detailed information of emergency information" as a broadcast communication message to the mobile terminal 4, after transmitting the paging signal (after the broadcast communication function of the mobile terminal 4 is activated).

The mobile terminal 4 includes a receiver unit 41, an emergency information notifying unit 42, and a detailed information display unit 43.

The receiver unit 41 is configured to receive the paging signal transmitted from the radio control apparatus (or the radio base station) 3, and to activate the broadcast communication function upon reception of the paging signal.

In addition, the receiver unit 41 is configured to receive the detailed information of emergency information transmitted from the radio control apparatus (or the radio base station) 3 as a broadcast communication message, after activating the broadcast communication function.

Moreover, the receiver unit 41 is configured to manage a broadcast communication message to be received.

Specifically, the receiver unit 41 is configured to manage a message identifier for identifying the broadcast communication message to be received, using a reception ID list.

In addition, the receiver unit 41 is basically configured to receive only the broadcast communication message managed as a broadcast communication message to be received, namely, the broadcast communication message including the message identifier managed in the reception ID list.

However, the receiver unit 41 is configured to receive a broadcast communication message including the "emergency information identifier", even when the broadcast communication message is not managed as a broadcast communication message to be received, or in other words, even when the broadcast communication message does not include the message identifier managed in the reception ID list.

In addition, the receiver unit 41 is similarly configured to receive the paging signal including the "emergency information identifier" without fail.

The emergency information notifying unit 42 is configured to notify, to the user, the "generation of the emergency information to be received (the occurrence of the emergency situation), when the "generation of the emergency information to be received (the occurrence of the emergency situation)" is notified by using the paging signal received by the receiver unit 41.

Specifically, the emergency information notifying unit 42 may be configured to perform the aforementioned notification to the user, by performing a display corresponding to the "type of emergency information" included in the paging signal received by the receiver unit 41 (a display of predetermined characters, images, or video images).

For example, when the mobile terminal 4 is roaming, the emergency information notifying unit 42 may perform the display corresponding to the "type of emergency information" in a language of a roaming destination country.

In addition, the emergency information notifying unit 42 may be configured to perform the aforementioned notification to the user, by displaying the "overview of emergency information" included in the paging signal received by the receiver unit 41.

Moreover, the emergency information notifying unit 42 may be configured to perform the aforementioned notification to the user, by performing an operation specified by the "terminal operation identifier" included in the paging signal received by the receiver unit 41.

For example, what is assumed as the operation specified by the "terminal operation identifier" is any selected operation such as a predetermined buzzer sound and a popup display. The detailed information display unit 43 is configured to display the "detailed information of emergency information" received as a broadcast communication message, after the broadcast communication function is activated by the paging signal received by the receiver unit 41.

(Operation of Mobile Communication System according to First Embodiment of Present Invention)

An operation of the emergency information delivering system according to the first embodiment of the present invention will be described with reference to FIG. 3 and FIG. 4.

Figure 3:
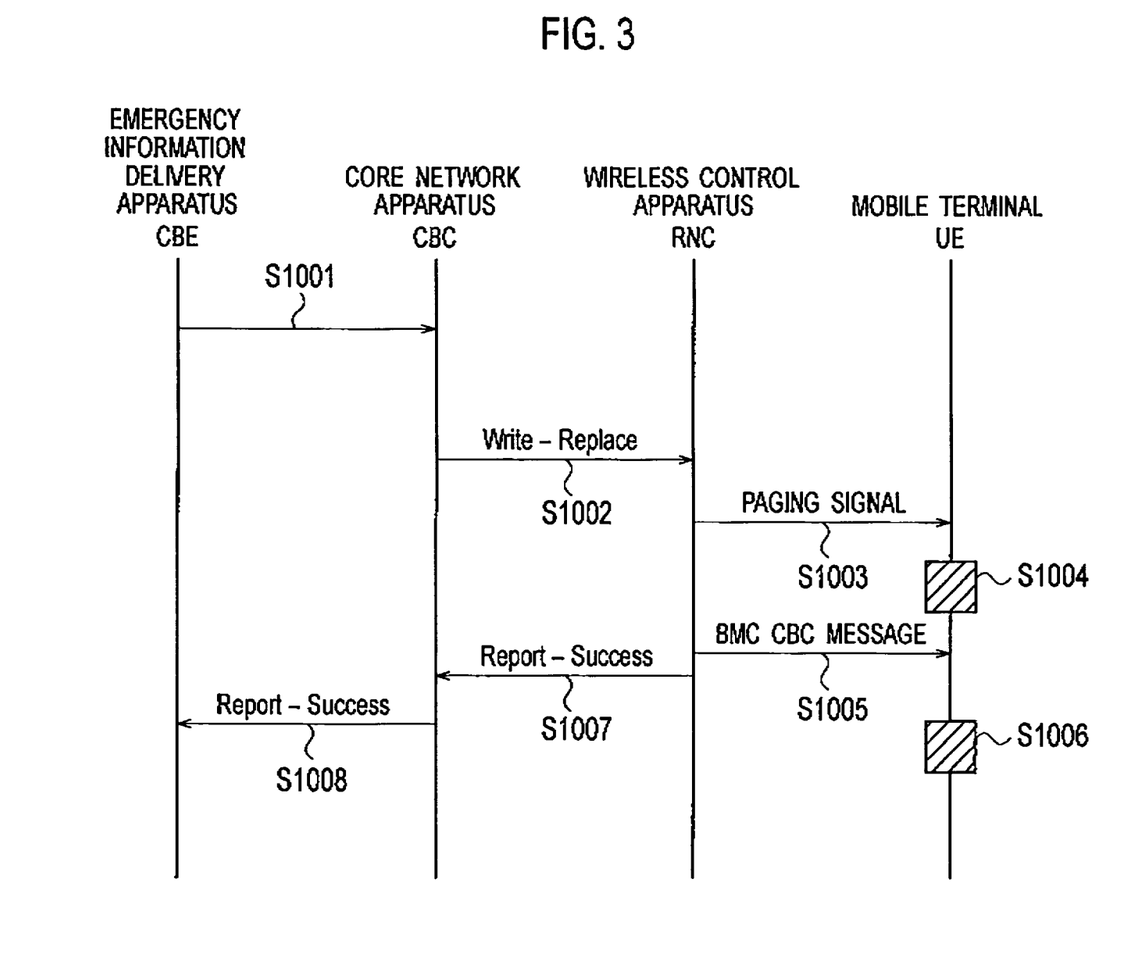
FIG. 3 is a sequence diagram showing an emergency information delivering method according to the first embodiment of the present invention.

First, with reference to FIG. 3, description will be given of the operation of delivering emergency information (Earthquake Early Warning) using the CBS system As shown in FIG. 3, in step S1001, an emergency information delivery apparatus CBE (Cell Broadcast Entity) delivers information required to deliver emergency information to a core network apparatus CBC (Cell Broadcast Center). The information includes the "emergency-information delivery area", the "type of emergency information (for example, the kind of a disaster)", the "overview of emergency information", and the "terminal operation identifier".

Here, if there is only an "Earthquake Early Warning", as the "type of emergency information", the core network apparatus CBC understands the "type of emergency information", and hence the deliver of the "type of emergency information" can be omitted.

In addition, if the "overview of emergency information" is generated in the core network apparatus CBC, the deliver of the "overview of emergency information" can be omitted.

In step S1002, based on the information received from the emergency information delivery apparatus CBE, the core network apparatus CBC transmits the following in addition to a normal parameter for the CBS, to a radio control apparatus RNC (or a radio base station) covering the "emergency-information delivery area". Specifically, transmitted are the "emergency information identifier", the "type of emergency information", the "overview of emergency information", the "detailed information of emergency information", the "terminal operation identifier", and the "emergency-information delivery area".

Specifically, the core network apparatus CBC adds the following information elements to a parameter "Write-Replace" defined in TS25.419 (SABP), and transmits the information elements. Specifically, the information elements added are the "emergency information identifier", the "type of emergency information", the "overview of emergency information", the "detailed information of emergency information", the "terminal operation identifier", and the "emergency-information delivery area".

In step S1003, when the "emergency information identifier" is set for the parameter "Write-Replace" that the radio control apparatus RNC (or the radio base station) has received from the core network apparatus CBC, the radio control apparatus RNC (or the radio base station) incorporates the "type of emergency information", the "overview of emergency information", and the "terminal operation identifier" in a CBS paging signal (defined in RRC: 3GPP TS25.331), so as to notify to a mobile terminal UE that belongs to the "emergency-information delivery area".

In step S1004, the mobile terminal UE that has received the CBS paging signal makes simplified notification to a user of the occurrence of an earthquake and an overview of the earthquake, while linking the "type of emergency information (Earthquake Early Warning)" and the "overview of emergency information".

Further, the mobile terminal UE performs an operation specified by the "terminal operation identifier" (for example, a buzzer sound) when the mobile terminal UE performs the aforementioned notification.

Here, the amount of information to be transmitted can be minimized by causing the mobile terminal UE to preliminarily determine a parameter for the "overview of emergency information" and where to insert the parameter for the "overview of emergency information" notified by the "overview of emergency information" in a defined format created by the mobile terminal UE.

In step S1005, the radio control apparatus RNC (or the radio base station) delivers the detailed information of the emergency information to the mobile terminal UE as a broadcast communication message (a BM CBS message).

In step S1006, the mobile terminal UE that has received the detailed information of the emergency information displays the detailed information of the emergency information accompanied with a buzzer sound, a popup, and the like, on the basis of the way specified by a serial number and the like.

In step S1007, the radio control apparatus RNC (or the radio base station) transmits a "Report-Success" to the core network apparatus CBC. In step S1008, the core network apparatus CBC transmits the "Report-Success" to the emergency information delivery apparatus CBE.

Second, with reference to FIG. 4, description will be given of the operation of delivering emergency information (Earthquake Early Warning) using the MBMS system.

Figure 4:
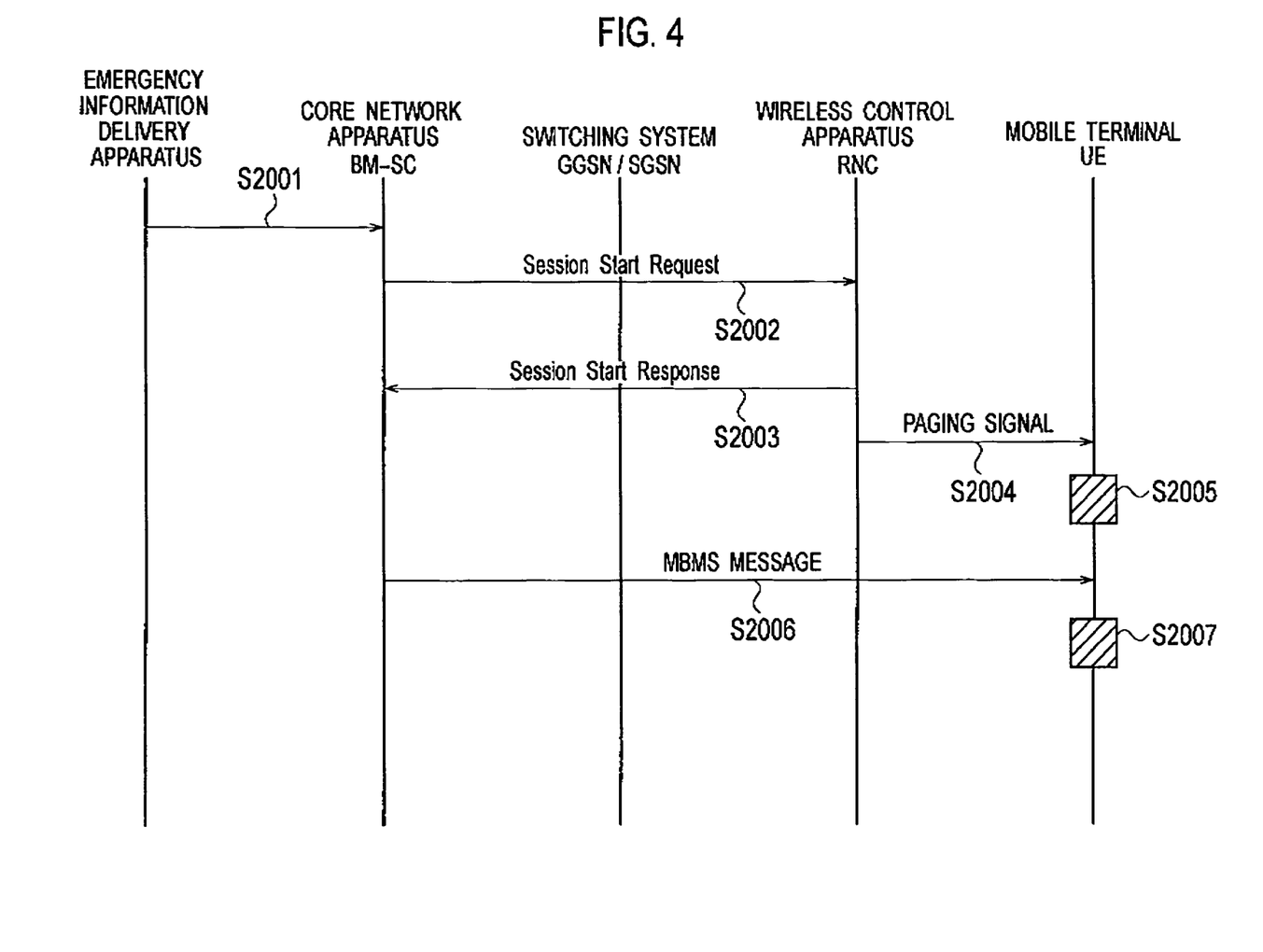
FIG. 4 is a sequence diagram showing an emergency information delivering method according to the first embodiment of the present invention.

As shown in FIG. 4, in step S2001, an emergency information delivery apparatus delivers information required to deliver emergency information to a core network apparatus BM-SC (Broadcast Multicast Service Center). The information includes the "emergency-information delivery area", the "type of emergency information (for example, the kind of a disaster)", the "overview of emergency information", and the "terminal operation identifier".

Here, if there is only an "Earthquake Early Warning", as the "type of emergency information", the core network apparatus BM-SC understands the "type of emergency information", and hence the deliver of the "type of emergency information" can be omitted.

In addition, if the "overview of emergency information" is generated in the core network apparatus BM-SC, the deliver of the "overview of emergency information" can be omitted.

In step S2002, based on the information received from the emergency information delivery apparatus, the core network apparatus BM-SC transmits the following in addition to a normal parameter for the MBMS, to a radio control apparatus RNC (or a radio base station) covering the "emergency-information delivery area" through a switching system GGSN (Gateway GPRS Support Node)/SGSN (Serving GPRS Support Node). Specifically, transmitted are the "emergency information identifier", the "type of emergency information", the "overview of emergency information", the "detailed information of emergency information", the "terminal operation identifier", and the "emergency-information delivery area".

Specifically, the core network apparatus BM-SC adds the following information elements to a parameter "Session Start Request (RAR(START))" defined in TS29.061 (PDN), and transmits the information elements. Specifically, the information elements added are the "emergency information identifier", the "type of emergency information", the "overview of emergency information", the "detailed information of emergency information", the "terminal operation identifier", and the "emergency-information delivery area" (PDN/GTP/RANAP).

In step S2003, the radio control apparatus RNC (or the radio base station) transmits a "Session Start Response" to the core network apparatus BM-SC through the switching system GGSN/SGSN.

In step S2004, when the "emergency information identifier" is set for the parameter "Session Start Request (RAR (START))" that the radio control apparatus RNC (or the radio base station) has received from the core network apparatus BM-SC, the radio control apparatus RNC (or the radio base station) incorporates the "type of emergency information", the "overview of emergency information", and the "terminal operation identifier" in a MBMS paging signal (RRC), so as to notify to a mobile terminal UE that belongs to the "emergency-information delivery area."

In step S2005, the mobile terminal UE that has received the MBMS paging signal makes simplified notification to a user of the occurrence of an earthquake and an overview of the earthquake, while linking the "type of emergency information (Earthquake Early Warning)" and the "overview of emergency information".

In step S2006, after establishing a MBMS session with the mobile station UE, the core network apparatus BM-SC delivers the detailed information of the emergency information to the mobile station UE through the switching system GGSN/SGSN, as a broadcast communication message (an MBMS message).

In step S2007, the mobile terminal UE that has received the detailed information of the emergency information displays the detailed information of the emergency information accompanied with a buzzer sound, a popup, and the like, on the basis of the way specified by a serial number and the like. (Advantageous Effects of Emergency Information Delivering System according to First Embodiment of Present Invention)

The emergency information delivering system according to the first embodiment allows a broadcasting system using a conventional infrastructure (CBS or MBMS) to notify a mobile terminal of the overview of emergency information by a paging signal, before a broadcast communication message (the detailed information of the emergency information) is delivered. Thereby, the emergency information delivering system is capable of helping a user to take a first action quickly, and reducing an influence on human lives caused by an emergency situation such as a disaster.

In addition, the emergency information delivering system according to this embodiment incorporates a terminal operation identifier in the paging signal, and thereby allows specification of the operation that the mobile terminal performs when receiving the overview of the emergency information.

In future, if efforts for emergency information delivery are made across the world and thus the emergency information message identifier is defined internationally, there coexist a mobile terminal that is set to receive a message having an emergency information message identifier uniquely used by a telecommunication carrier and a mobile terminal that is set to receive a message having an emergency information message identifier commonly used across the world. Even in this case, according to the emergency information delivering system according to this embodiment, emergency information transmitted only once can reach both of the mobile terminals even by using the existing emergency information message identifier uniquely used by a telecommunication carrier. Thereby the emergency information message identifier can be smoothly shifted from the one unique to a telecommunication carrier to the one common across the world.

Note that operations of the aforementioned mobile terminal, radio base station, and radio control apparatus may be performed by hardware, a software module executed by a processor, or a combination of the two.

The software module may be provided in a storage medium of any form including a RAM (Random Access Memory), a flash memory, a ROM (Read Only Memory), an EPROM (Erasable Programmable ROM), an EEPROM (Electronically Erasable and Programmable ROM), a register, a hard disk, a removable disk, and a CD-ROM.

The storage medium is connected to the processor so that the processor can read and write information from and onto the storage medium. The storage medium may be integrated with the processor. In addition, the storage medium and the processor may be provided in an ASIC. The ASIC may be provided in the mobile station UE and the radio base station eNB. Further, the storage medium and the processor may be provided in the mobile station UE and the radio base station eNB as a discrete component.

The present invention has been described above in detail by using the above embodiment. However, it is apparent for those skilled in the art that the present invention is not limited to the embodiment described in this specification. The present invention can be implemented as amended or modified forms without departing from the spirit and scope of the present invention, which is defined by the description of the scope of claims. The description of this specification has been given to illustrate the present invention, and therefore is not intended to limit the present invention.

Note that the disclosure of Japanese Patent Application No. 2007-280557 (filed on Oct. 29, 2007) is incorporated herein by reference in its entirety.

Industrial Applicability

As described above, the present invention provides an emergency information delivering method, a radio control apparatus, a radio base station, and a mobile terminal which can notify each user of the presence of emergency information earlier than with existing broadcasting systems.

In addition, the present invention provides an emergency information delivering method, a radio control apparatus, a radio base station, and a mobile terminal which can deliver emergency information efficiently without reception delay between coexisting mobile terminals, one having an emergency information message identifier unique to a telecommunication carrier and the other having an emergency communication message identifier common across the world.

The invention claimed is:

1. An emergency information delivering method for delivering emergency information to a mobile terminal using broadcast communication, comprising the steps of:

notifying, to the mobile terminal, generation of emergency information to be received, by transmitting a paging signal used to activate a broadcast communication function of the mobile terminal, the paging signal including an overview of the emergency information and a terminal operation identifier specifying an operation of the mobile terminal to alert the user of the notification by the paging signal;

notifying, from the mobile terminal to a user, the generation of the emergency information in response to the notification by the paging signal by performing the operation to alert the user of the notification by the paging signal and displaying the overview of the emergency information included in the received paging signal;

receiving, at the mobile terminal, detailed information of the emergency information as a broadcast communication message after performing the operation to alert the user of the notification by the paging signal and displaying the overview of the emergency information included in the received paging signal; and displaying, at the mobile terminal, the detailed information, after the broadcast communication function is activated by the paging signal, the detailed information being received as the broadcast communication message.

2. The emergency information delivering method according to claim 1, wherein
the paging signal includes a type of the emergency information; and
the mobile terminal performs the notification to the user, by performing a display corresponding to the type of the emergency information included in the received paging signal.

3. The emergency information delivering method according to any one of claims 1 to 2, wherein
the mobile terminal manages a broadcast communication message to be received; and
the mobile terminal receives the broadcast communication message, even when the broadcast communication message is not managed as the broadcast communication message to be received, and if the broadcast communication message includes an emergency information identifier identifying the detailed information of the emergency information.

4. The emergency information delivering method according to claim 1, wherein the paging signal is a cell broadcast service (CBS) paging signal.

5. The emergency information delivering method according to claim 1, wherein the broadcast communication message is a cell broadcast service (CBS) broadcast message.

6. The emergency information delivering method according to claim 1, wherein the operation to alert the user of the notification by the paging signal is a predetermined buzzer sound or a popup display.

7. A radio control apparatus configured to transmit emergency information to a mobile terminal with use of broadcast communication, wherein
the radio control apparatus is configured to notify, to the mobile terminal, generation of emergency information to be received, by use of a paging signal used to activate a broadcast communication function of the mobile terminal, the paging signal including an overview of the emergency information and a terminal operation identifier specifying an operation of the mobile terminal to alert a user of the notification by the paging signal; and
the radio control apparatus is configured to transmit, to the mobile terminal, detailed information of the emergency information as a broadcast communication message, after transmitting the paging signal to the mobile terminal such that the broadcast communication message is received at the mobile terminal after the mobile terminal has performed the operation to alert the user of the notification by the paging signal and has displayed the overview of the emergency information included in the paging signal.

8. A radio base station configured to transmit emergency information to a mobile terminal with use of broadcast communication, wherein
the radio base station is configured to notify, to the mobile terminal, of generation of emergency information to be received, by use of a paging signal used to activate a broadcast communication function of the mobile terminal, the paging signal including an overview of the emergency information and a terminal operation identifier specifying an operation of the mobile terminal to alert a user of the notification by the paging signal; and
the radio base station is configured to transmit, to the mobile terminal, detailed information of the emergency information as a broadcast communication message, after transmitting the paging signal to the mobile terminal such that the broadcast communication message is received at the mobile terminal and after the mobile terminal has performed the operation to alert the user of the notification by the paging signal and has displayed the overview of the emergency information included in the paging signal.

9. A mobile terminal configured to receive emergency information with use of broadcast communication, wherein
the mobile terminal being configured to notify, to a user, generation of emergency information to be received, when the generation of the emergency information to be received is notified by a paging signal used to activate a broadcast communication function of the mobile terminal, the paging signal including an overview of the emergency information and a terminal operation identifier specifying an operation of the mobile terminal to alert the user of the notification by the paging signal; and
the mobile terminal being configured to display detailed information of the emergency information received as a broadcast communication message, after the broadcast communication function is activated by the paging signal and after the mobile terminal has performed the operation to alert the user of the notification by the paging signal and has displayed the overview of the emergency information included in the received paging signal.

10. The mobile terminal according to claim 9, wherein
the mobile terminal is configured to perform the notification to the user, by performing a display corresponding to a type of the emergency information included in the received paging signal.

11. The mobile terminal according to any one of claims 9 to 10, wherein
the mobile terminal is configured to manage a broadcast communication message to be received; and
the mobile terminal is configured to receive the broadcast communication message, even when the broadcast communication message is not managed as the broadcast communication message to be received, and if the broadcast communication message includes an emergency information identifier identifying the detailed information of the emergency information.

\* \* \* \* \*